United States Patent
Koike

(10) Patent No.: US 7,031,080 B2
(45) Date of Patent: Apr. 18, 2006

(54) PHOTOGRAPHIC LENS

(75) Inventor: Kazumi Koike, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 27 days.

(21) Appl. No.: 10/921,919

(22) Filed: Aug. 20, 2004

(65) Prior Publication Data

US 2005/0041309 A1 Feb. 24, 2005

(30) Foreign Application Priority Data

Aug. 20, 2003 (JP) .............................. 2003-208052

(51) Int. Cl.
G02B 9/06 (2006.01)
(52) U.S. Cl. ..................... 359/794; 359/717; 359/740
(58) Field of Classification Search ........ 359/793–794, 359/740, 717
See application file for complete search history.

(56) References Cited

U.S. PATENT DOCUMENTS

| | | | | |
|---|---|---|---|---|
| 5,812,327 A | * | 9/1998 | Doh ........................... | 359/793 |
| 6,097,551 A | * | 8/2000 | Kreitzer ....................... | 359/793 |
| 6,335,835 B1 | * | 1/2002 | Koike ......................... | 359/717 |
| 6,628,463 B1 | * | 9/2003 | Koike ......................... | 359/793 |

FOREIGN PATENT DOCUMENTS

JP        2002-23050        1/2002

* cited by examiner

Primary Examiner—Jordan M. Schwartz
(74) Attorney, Agent, or Firm—Young & Thompson

(57) ABSTRACT

A photographic lens has a first and second positive lens. The first lens is a meniscus lens having a convex object side surface. The second lens is a double-convex lens. The photographic lens satisfies the following conditions:

$$5.6 \leq f < 8;\ F1 > F2;\ 0.39 < F/F1 \leq 0.5;\ 0.15 < R1/F < 0.19;$$
$$1.4 < (F/R3)\cdot f \leq 3.0;\ \text{and}\ R3 > |R4|$$

wherein F is an overall focal length, F1 is a focal length of the first lens, F2 is a focal length of the second lens, f is a ratio of the overall focal length F to an effective aperture size defined by the first stop, R1 is a radius of curvature of the object side surface of the first lens, R3 and R4 are radii of curvature of the object side spherical surface and of an average spherical surface of the image side aspherical surface of the second lens.

4 Claims, 10 Drawing Sheets

PHOTOGRAPHIC LENS

FIELD OF THE INVENTION

The present invention relates to a photographic lens that is suitable for a fixed focus camera.

BACKGROUND ARTS

Fixed focus cameras are provided with a relatively wide-angle photographic lens of which effective aperture is confined to a small size by a stop, so that the photographic lens is preset to have such a large depth of field that allows to omit focusing. Because the fixed focus cameras do not need any focusing mechanism, their structures can be so simple as to save the manufacturing cost.

Lens-fitted photo film units produced by the present applicant are a kind of fixed focus camera. The lens-fitted photo film unit is reloaded with a roll of unexposed photo filmstrip, so that anyone can take photographs of satisfactory quality just by winding the film and making shutter release operations.

The lens-fitted photo film unit has a photographic lens that consists of at least a lens element made of optical plastics, for example, a couple of positive lenses. Where the contained filmstrip has a film speed of ISO 400, the lens-fitted photo film unit regularly has a fixed stop having an f-number of 11 to 10, and a fixed shutter speed of about 1/100 sec, so as to be suitable for photography in bright daylight.

Recently, such film units have been known that have two differently sized stop apertures which are switched over depending upon subject brightness.

The photographic lens consisting of a limited number of small plastic lenses cannot sufficiently correct the curvature of the field. In order to reduce image deterioration that would be caused by the curvature of the field, the lens-fitted photo film unit holds the photo filmstrip to curve the film surface at the exposure position.

Also the photographic lens composed of a couple of lens elements has relatively large residual aberrations. Therefore, many kinds of refinements have been made on this type of photographic lens to improve image-forming performance. For example, Japanese Laid-open Patent Application No. 2002-23050 discloses a photographic lens consisting of, in the order from the object side, a first or front meniscus lens and a second or rear double-convex lens, wherein an image side surface of the first lens and an image side surface of the second lens are formed aspherical. According to this configuration, aberrations are corrected while improving the lens speed.

Indeed the photographic lens of the above mentioned prior art is designed to improve the performance, but if the first lens element or a front lens has an error of 0.01 mm in center thickness on the manufacture, variations in flange back will come to about 0.1 mm, that is about ten times the error amount. It is to be noted that the flange back means an ideal distance between the lens position and the film surface to be exposed in the camera. That is, the flange back is equal to the length from the lens to its back focus. Therefore, if the center thickness of the front lens has an error, the quality of photographs will be lowered remarkably.

In other words, the photographic lens of the above prior art is highly sensitive to the dimensional accuracy of its lens elements. In order to manufacture the lens elements with sufficient accuracy for achieving the designed performance of this prior art, the efficiency of manufacture would be lowered.

The above mentioned disadvantage of the prior art comes from the fact that the first lens tends to have a small radius of curvature on either side in the photographic lens wherein the first lens is a meniscus lens and the second lens is a double-convex lens, although this type of photographic lens is easy to correct the aberrations.

The larger the light bundle is refracted on the object side surface of the first lens, the larger the angle between the refracted light bundle and its optical axis becomes. So the height of the exiting light bundle from the first lens varies greatly as the center thickness of the first lens varies, resulting in bigger variations in the flange back.

SUMMARY OF THE INVENTION

In view of the foregoing, a primary object of the present invention is to provide a photographic lens consisting of first and second lens elements, which is less sensitive to the error in center thickness of the first lens element, and is improved on lens speed over the conventional ones.

To achieve the above and other objects, a photographic lens of the present invention satisfies the following conditions, on the assumption that the lens speed or f-number of the photographic lens is 5.6 to 8 where deviation of the focal point greatly damages the quality of photographs.

The first condition specified by the present invention is that a first or front lens element has a longer focal length F1 than a focal length F2 of a second or rear lens element.

By setting the focal length F1 of the first lens element longer than conventional, the power of refraction of the first lens element is reduced, so that the sensitivity to the error is reduced.

As the second condition, an overall focal length F of the photographic lens of the present invention is defined such that F/F1 is more than 0.39 and not more than 0.5.

By setting the ratio of the total focal length F to the focal length F1 of the first lens element to satisfy the condition $0.39<F/F1\leq0.5$, not only manufacturability of the photographic lens but also image surface lightness are improved. If the value F/F1 goes below the lower limit, the error sensitivity cannot be reduced. Above the upper limit, it is difficult to improve the lens speed without lowering the lens performance.

The third condition is that the first lens element has an object side surface whose radius of curvature R1 is defined relative to the overall focal length F, such that R1/F is more than 0.15 and less than 0.19. This configuration not only reduces the sensitivity to the error in center thickness, but also reduces the curvature of the field that is caused by variations in refractive power of the first lens element.

The condition $0.15<R1/F<0.19$ is effective for reducing the error sensitivity and also for preventing curvature of the field from lowering lens performance, wherein R1 is the radius of curvature of the object side surface of the first lens element whose focal length is longer than conventional. If the value R1/F is below the lower limit, the error sensitivity would increase. If the value R1/F is above the upper limit, the curvature of the field would increase.

As the refractive power of the first lens element being reduced, the focal length F2 of the second lens element must be shortened in order to keep the total focal length of the photographic lens constant.

For the sake of preventing worsening the image-forming performance as the result of variations in refractive power of the second lens element, the photographic lens of the present invention satisfies the fourth condition: $1.4<(F/R3)\cdot f\leq3.0$, wherein R3 is a radius of curvature of an object side surface of the second lens element, F is the total focal length and f is the f-number of the photographic lens. This configuration makes sure to achieve adequate image-forming performance with regard to the lens speed.

The condition $1.4 < (F/R3) \cdot f \leq 3.0$ is effective for reducing the sensitivity to the error in center thickness of the first lens element while balancing various aberrations with each other at a higher lens speed.

As the fifth condition, the second lens element is a double-convex lens with spherical object side surface and aspherical image side surface. The object side surface has a weaker refractive power, whereas the image side surface has a stronger refractive power. This configuration permits shorting the total length of the photographic lens while correcting distortions.

According to a preferred embodiment of the invention, the image side surface of the first lens element is aspherical. This configuration further reduces the aberrations. As the first lens element satisfies the above conditions, the refractive power of the first lens element is kept from being too small, so that the maximum corrective effect of the aspherical surface on the aberrations is obtained.

According to another preferred embodiment, the photographic lens is provided with a second stop member that may be inserted into or moved out of a light path between the first lens element and a first stop of the photographic lens.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
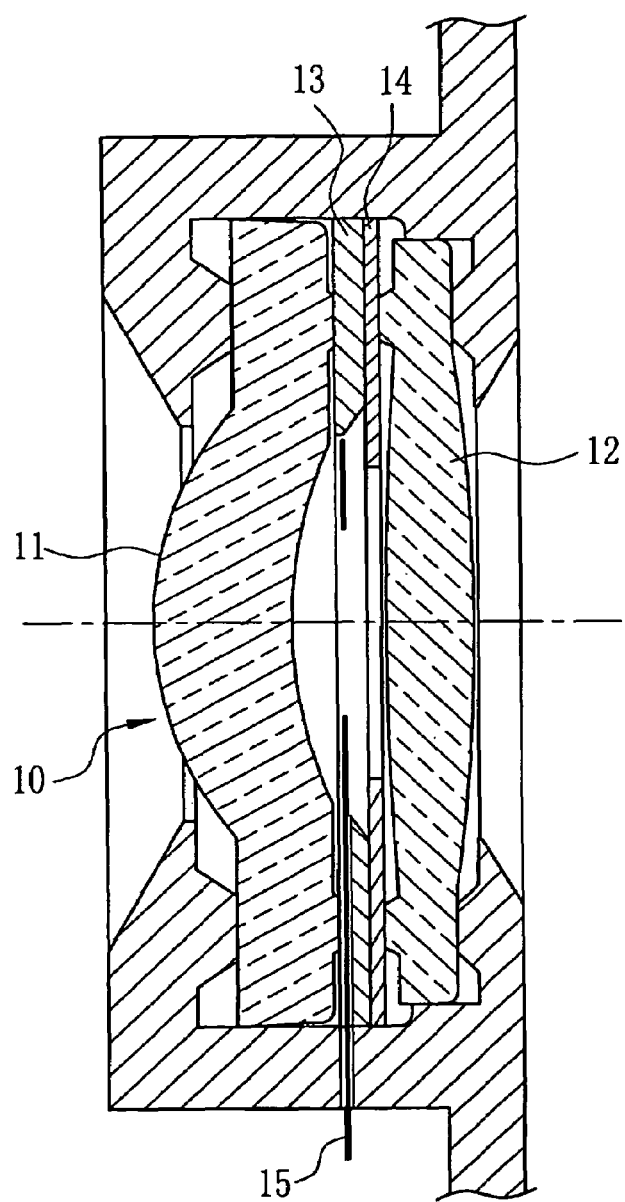
FIG. 1 is a sectional view of a photographic lens held in a lens holder.

In FIG. 1, a photographic lens 10 consists of, in the order from the object side, a first positive lens 11 and a second positive lens 12.

The first positive lens 11 is a meniscus lens having a convex object side surface and a concave image side surface.

Both the image side surface of the first positive lens 11 and an image side surface of the second positive lens 12 are formed to be aspherical.

The second positive lens 12 is a double-convex lens having convex surfaces on both sides.

A spacer 13 and an aperture stop (a first stop) 14 are disposed between the first positive lens 11 and the second positive lens 12. The spacer 13 provides a space between the two lens elements 11 and 12, whereas the aperture stop 14 limits the quantity of light from the subject that enters through the photographic lens 10.

The spacer 13 serves as a flare stop for blocking extraneous light beams that may fall in from outside the filed angle and cause flares.

The aperture stop 14 is placed on the image side of the spacer 13, and defines an effective aperture size at which the photographic lens 10 has the highest possible speed while obtaining satisfying image-forming performance The spacer 13 is formed to have a thinned portion on the object side so as to provide a gap between the first positive lens 11 and the spacer 13. Into this gap is inserted a movable stop member (a second stop) 15 with a smaller stop size than the aperture stop 14. Then the movable stop member 15 is set in a light path of the light that travels from the subject through the photographic lens 10.

The movable stop member 15 is switched over between the position inserted in the subject light path and a position retracted from the subject light path, for example, as being driven by a driver, such as a solenoid, that is connected to a photometry circuit measuring the subject brightness. The movable stop member 15 may be manually switched over.

While the movable stop member 15 is inserted in the subject light path, over-exposure is prevented at the photography under bright day light or the like when the subject brightness is high.

At a low subject brightness, like at the night photography, the movable stop member 15 is to be displaced from the light path so as to prevent under-exposure.

The movable stop member 15 placed on the object side of the aperture stop 14 restricts color dispersion of the subject light after passing through the first positive lens 11. Such color dispersion is due to chromatic aberration of magnification of the first positive lens 11. Therefore, this configuration prevents lowering the image quality of the photographs that can be caused by the chromatic aberration of magnification.

Now concrete examples of the present invention will be described.

EXAMPLE 1

Figure 2:
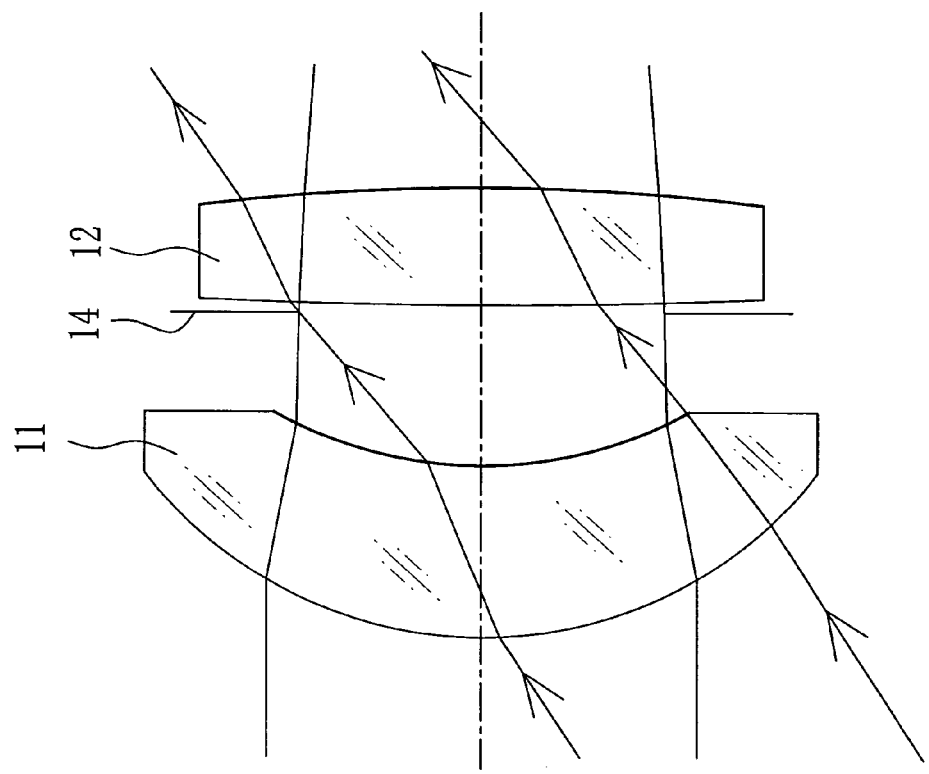
FIG. 2 is a schematic diagram showing a lens structure according to Example 1 of the present invention.

FIG. 2 shows a lens structure of Example 1, and Tables 1 and 2 show lens data and aspherical coefficients for Example 1 respectively.

Designated by "n"(n=1, 2, 3 . . . ) is the surface number of respective lens surfaces in the order from the object side, "Rn" (n=1, 2, 3 . . . ) is the radius of curvature of the respective lens surfaces, "Dn" is the thickness of the lenses or the air space between the lenses, "Nd" and "νd" are the refractive index and the dispersive power with respect to d-line (587.56 nm).

The same applies to the other examples.

The second and fourth surfaces, i.e. the image side surfaces of the first and second lenses, are aspherical in any example, and these aspherical surfaces satisfy the following condition:

$$Z = ch^2/[1+\sqrt{\{1-(1+K)c^2h^2\}}]+Ah^4+Bh^6+Ch^8+Dh^{10}.$$

In the above equation, "c" is a reciprocal to the radius of curvature (c=1/Rn) and "h" is a height from the optical axis.

TABLE 1

| n | Rn | Dn | Nd | vd |
|---|---|---|---|---|
| 1 | 5.042 | 2.1 | 1.492 | 57.5 |
| 2 | 5.07* | 1.87 | | |
| Stop | Infinity | 0.1 | | |
| 3 | 66.41 | 1.42 | 1.492 | 57.5 |
| 4 | −35.664* | 26.34 | | |
| Film | −149.33 | −0.595 | | |

TABLE 2

| n | 2 | 4 |
|---|---|---|
| K | 0.056484 | 0.000000 |
| A | 0.3799777E−3 | −0.286163E−3 |
| B | 0.537644E−4 | 0.362122E−4 |
| C | −0.79496E−6 | −0.319652E−5 |
| D | 0.000000 | 0.52393E−7 |

By setting the numerical values as above, the total focal length F of the photographic lens 10, the focal length F1 of the first lens 11, the focal length F2 of the second lens 12, the f-number f (the ratio of the total focal length F to the effective aperture size of the aperture stop 14), and the half view angle ω of the photographic lens 10 will have the following values: F=31.9 mm;
F1=71.93 mm;
F2=47.37 mm;
f=5.9; and
ω=34.80°.
Therefore,
F/F1=0.44;
R1/f=0.158; and
(F/R3)·f=2.83 wherein R1 is the radius of curvature of the first surface, R3 is the radius of curvature of the third surface.

According to Example 1, the flange back varies by 0.066 mm as the center thickness of the first lens element 11 varies by 0.01 mm. So the error sensitivity is 6.6 times.

Figure 3:
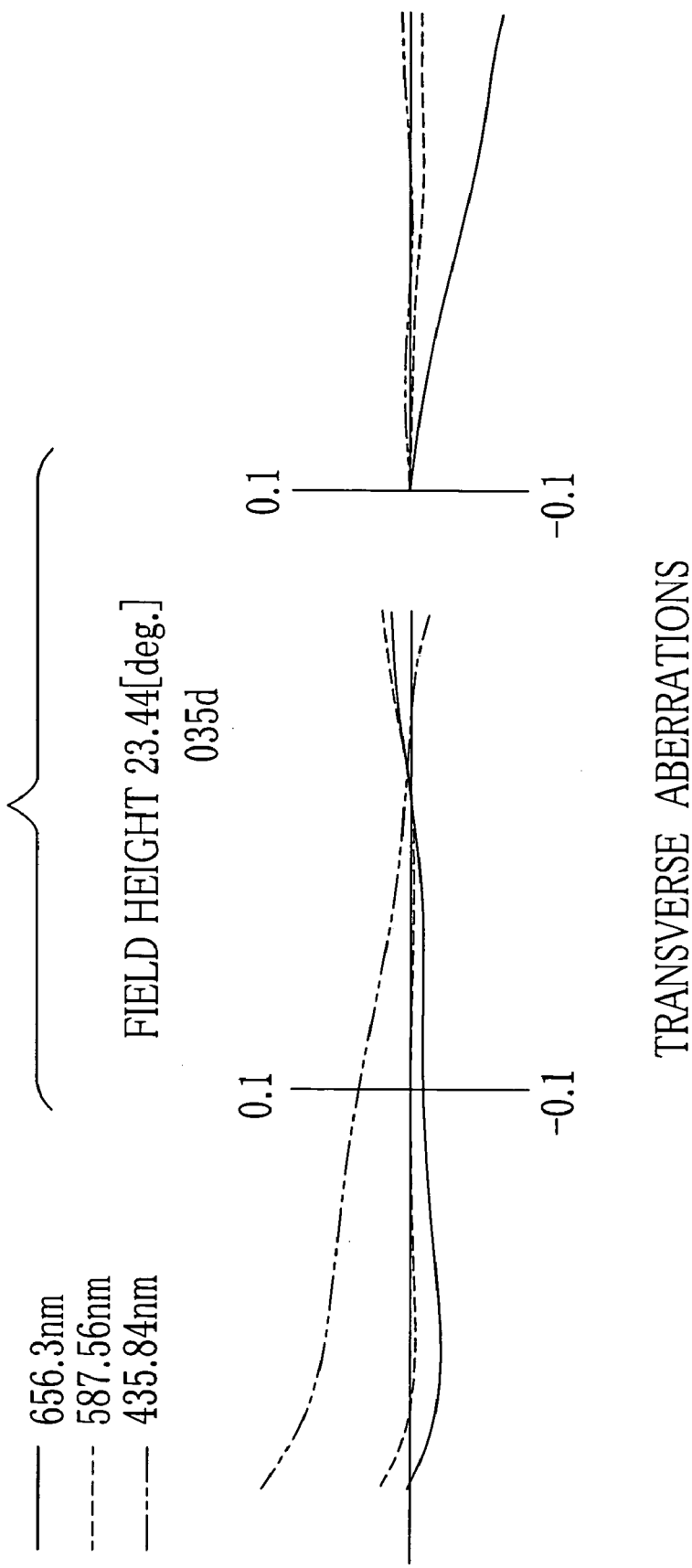
FIG. 3 is a diagram showing transverse aberrations according to Example 1 of the present invention.
Figure 4:
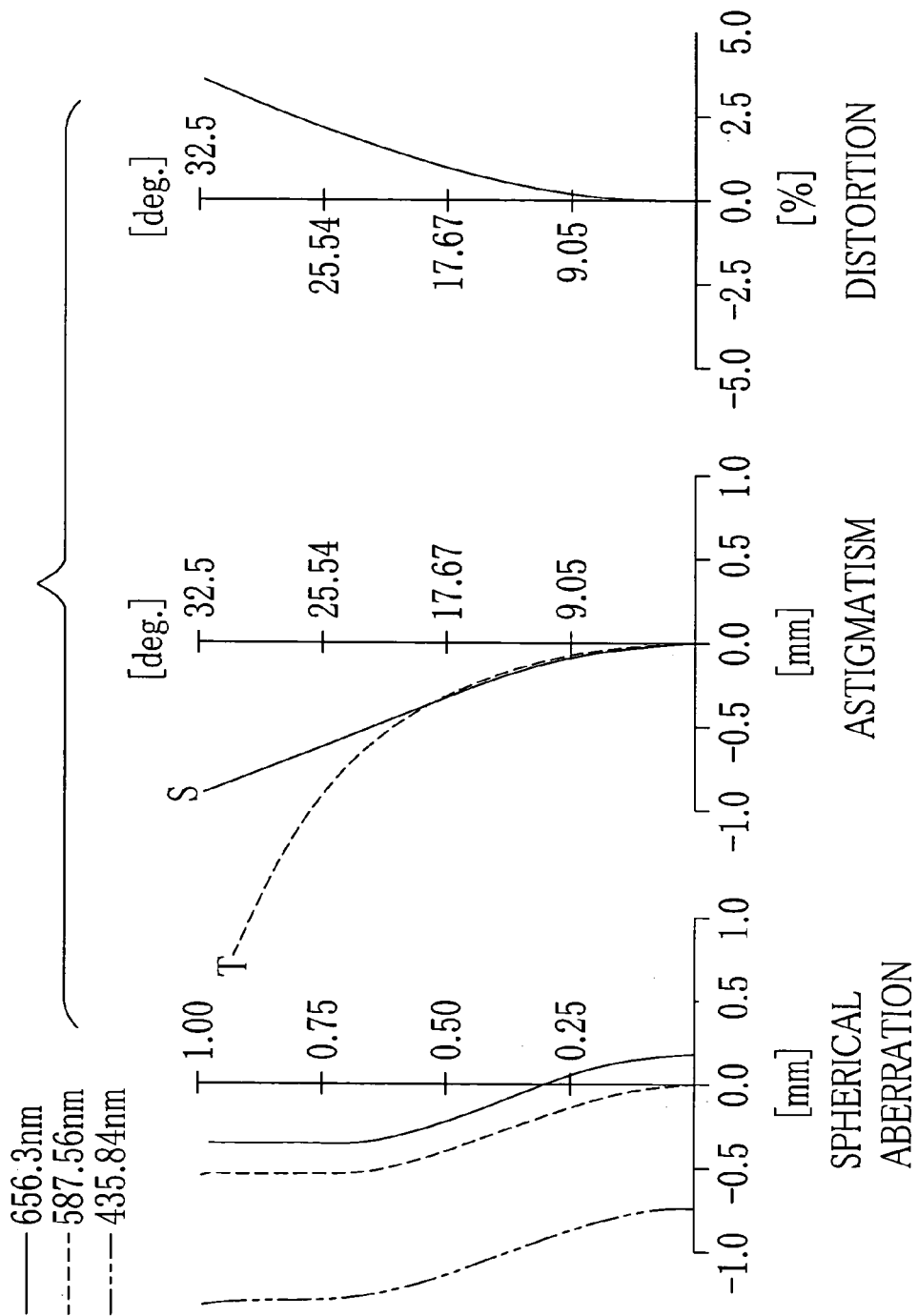
FIG. 4 is a schematic diagram showing longitudinal aberrations according to Example 1.

Various aberrations of Example 1 are illustrated in FIGS. 3 and 4.

EXAMPLE 2

Figure 5:
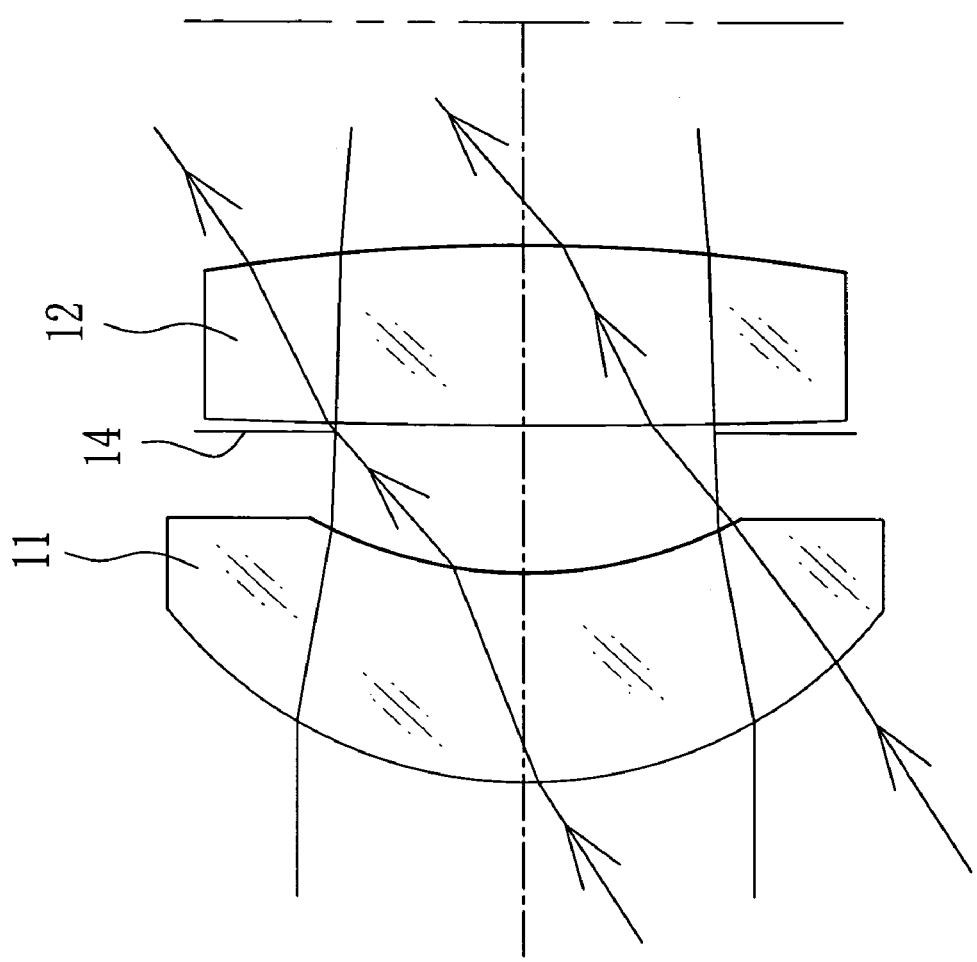
FIG. 5 is a schematic diagram showing a lens structure according to Example 2 of the present invention.

FIG. 5 shows a lens structure of Example 2, and Tables 3 and 4 show lens data and aspherical coefficients for Example 2 respectively.

TABLE 3

| n | Rn | Dn | Nd | vd |
|---|---|---|---|---|
| 1 | 5.699 | 2.65 | 1.492 | 57.5 |
| 2 | 5.775* | 1.762 | | |
| Stop | Infinity | 0.1 | | |
| 3 | 119.687 | 2.255 | 1.492 | 57.5 |
| 4 | −28.524* | 25.4 | | |
| Film | −149.33 | −0.54 | | |

TABLE 4

| n | 2 | 4 |
|---|---|---|
| K | 0.0529637 | 0.000000 |
| A | −0.160337E−4 | −0.119867E−3 |
| B | 0.411345E−4 | −0.271515E−6 |
| C | −0.226599E−5 | 0.132466E−6 |
| D | 0.000000 | −0.305712E−7 |

According to Example 2, the total focal length F of the photographic lens 10, the focal length F1 of the first lens 11, the focal length F2 of the second lens 12, the f-number f (the ratio of the effective aperture size of the aperture stop 14 to the total focal length F), and the half view angle ω of the photographic lens 10 will have the following values:
F=32 mm;
F1=70.49 mm;
F2=47.05 mm;
f=5.6; and
ω=34.80°.
Therefore,
F/F1=0.45;
R1/f=0.178; and
(F/R3)·f=1.5.

According to Example 2, the flange back varies by 0.052 mm as the center thickness of the first lens element 2 varies by 0.01 mm. So the error sensitivity is 5.2 times.

Figure 6:
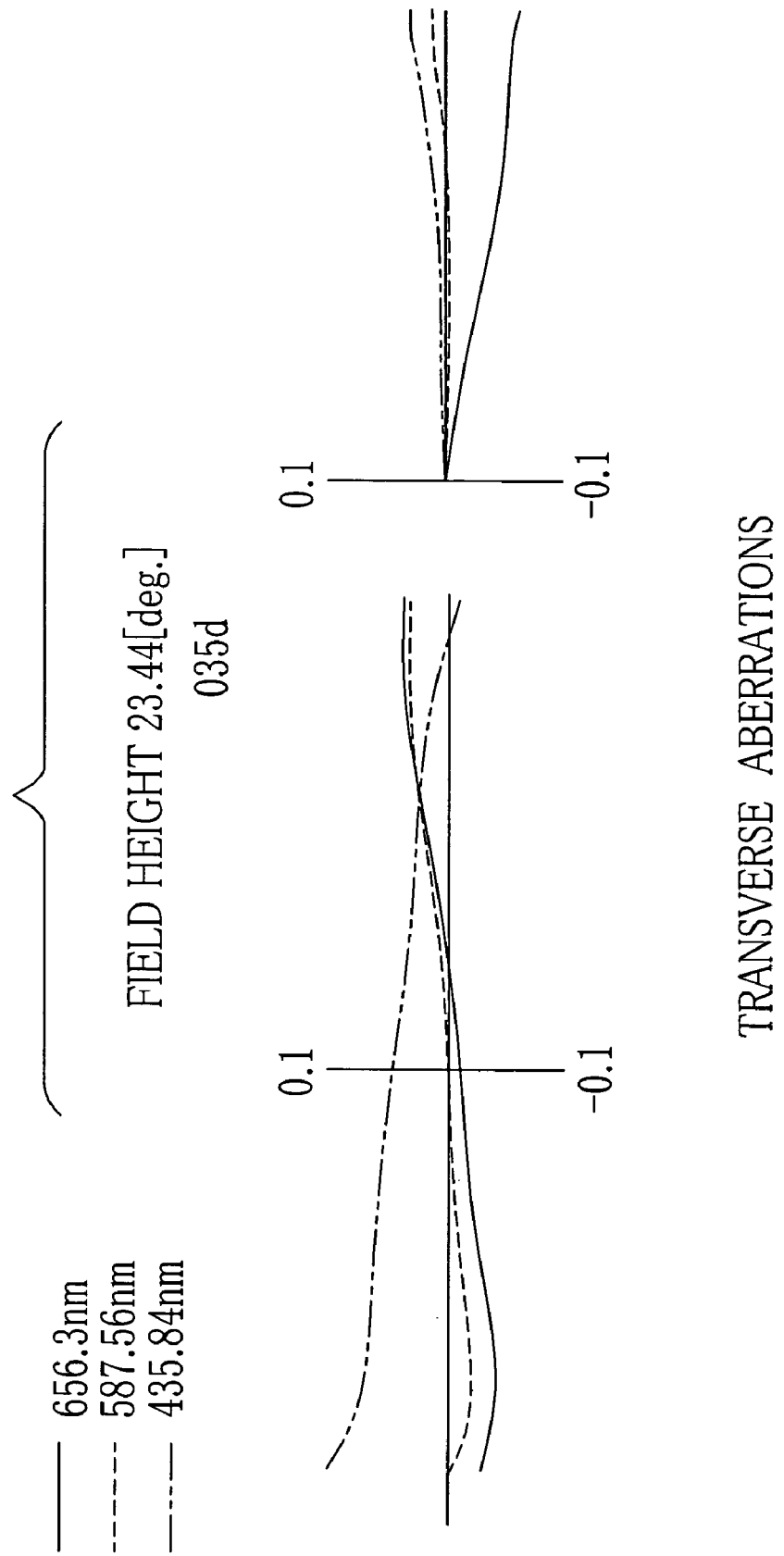
FIG. 6 is a diagram showing transverse aberrations according to Example 2 of the present invention.
Figure 7:
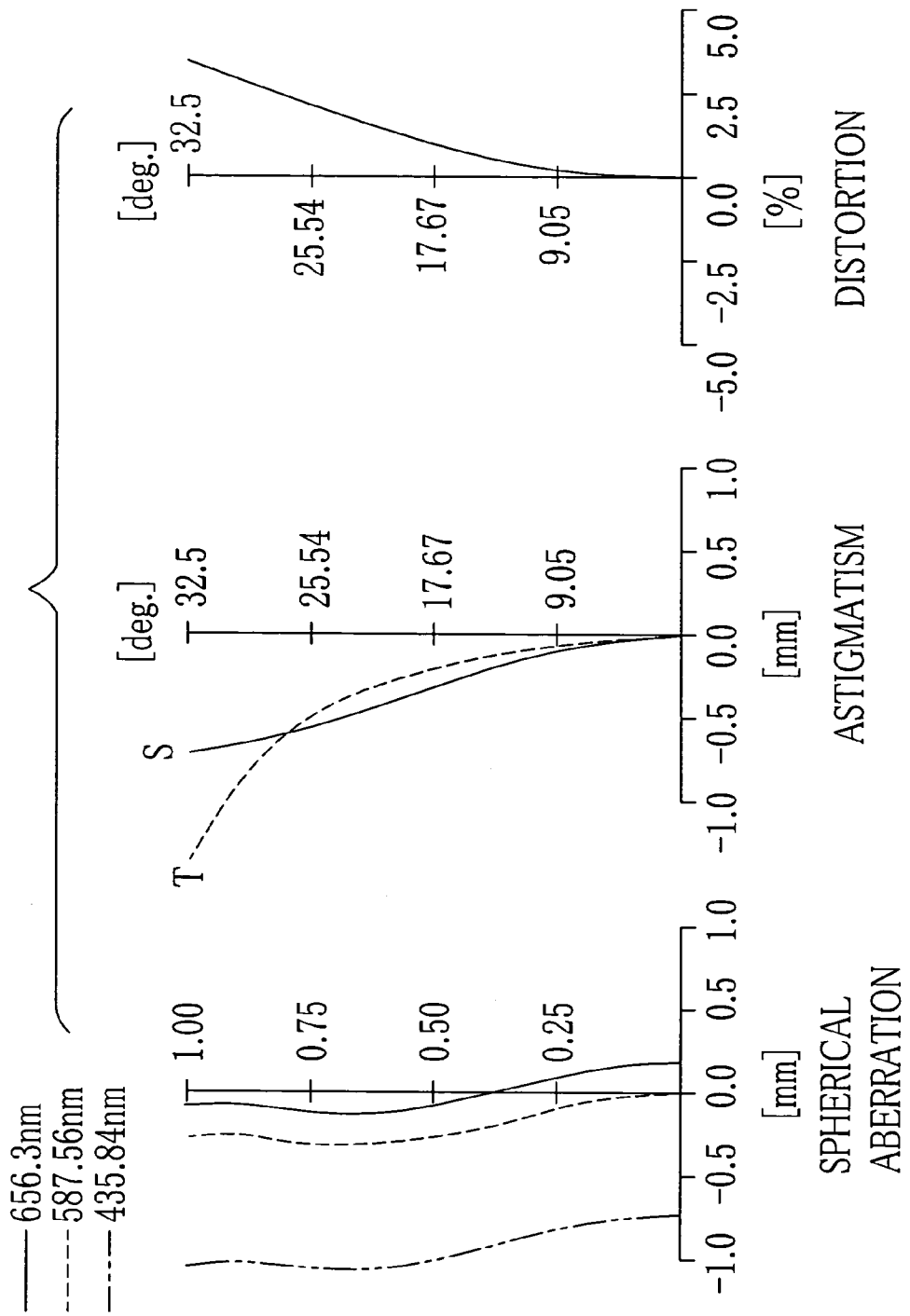
FIG. 7 is a schematic diagram showing longitudinal aberrations according to Example 2.

Various aberrations of Example 2 are illustrated in FIGS. 6 and 7.

EXAMPLE 3

Figure 8:
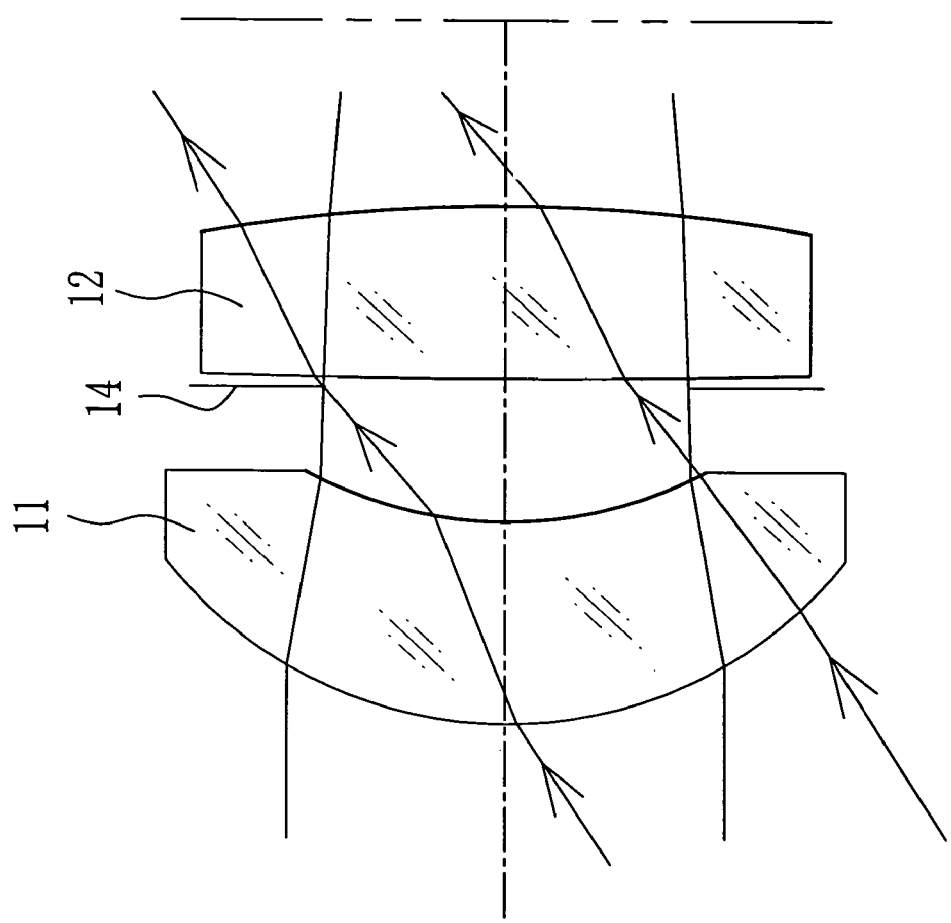
FIG. 8 is a schematic diagram showing a lens structure according to Example 3 of the present invention.

FIG. 8 shows a lens structure of Example 3, and Tables 5 and 6 show lens data and aspherical coefficients for Example 3 respectively.

TABLE 5

| n | Rn | Dn | Nd | vd |
|---|---|---|---|---|
| 1 | 5.713 | 2.64 | 1.492 | 57.5 |
| 2 | 5.799* | 1.76 | | |
| Stop | Infinity | 0.1 | | |
| 3 | 127.53 | 2.25 | 1.492 | 57.5 |
| 4 | −28.32* | 25.41 | | |
| Film | −149.33 | −0.59 | | |

TABLE 6

| n | 2 | 4 |
|---|---|---|
| K | 1.2309 | 0.000000 |
| A | −0.501166E−3 | −0.157315E−3 |
| B | 0.327578E−4 | 0.102189E−4 |
| C | −0.611505E−5 | −0.879306E−6 |
| D | 0.000000 | 0.211327E−8 |

According to Example 3, the total focal length F of the photographic lens 10, the focal length F1 of the first lens 11, the focal length F2 of the second lens 12, the f-number f, and the half view angle ω will have the following values:
F=32 mm;
F1=67 mm;
F2=47.32 mm;
f=5.6; and
ω=34.8°.
Therefore,
F/F1=0.48;
R1/f=0.179; and
(F/R3)·f=1.41.

According to Example 3, the flange back varies by 0.052 mm as the center thickness of the first lens element 2 varies by 0.01 mm. So the error sensitivity is 5.2 times.

Figure 9:
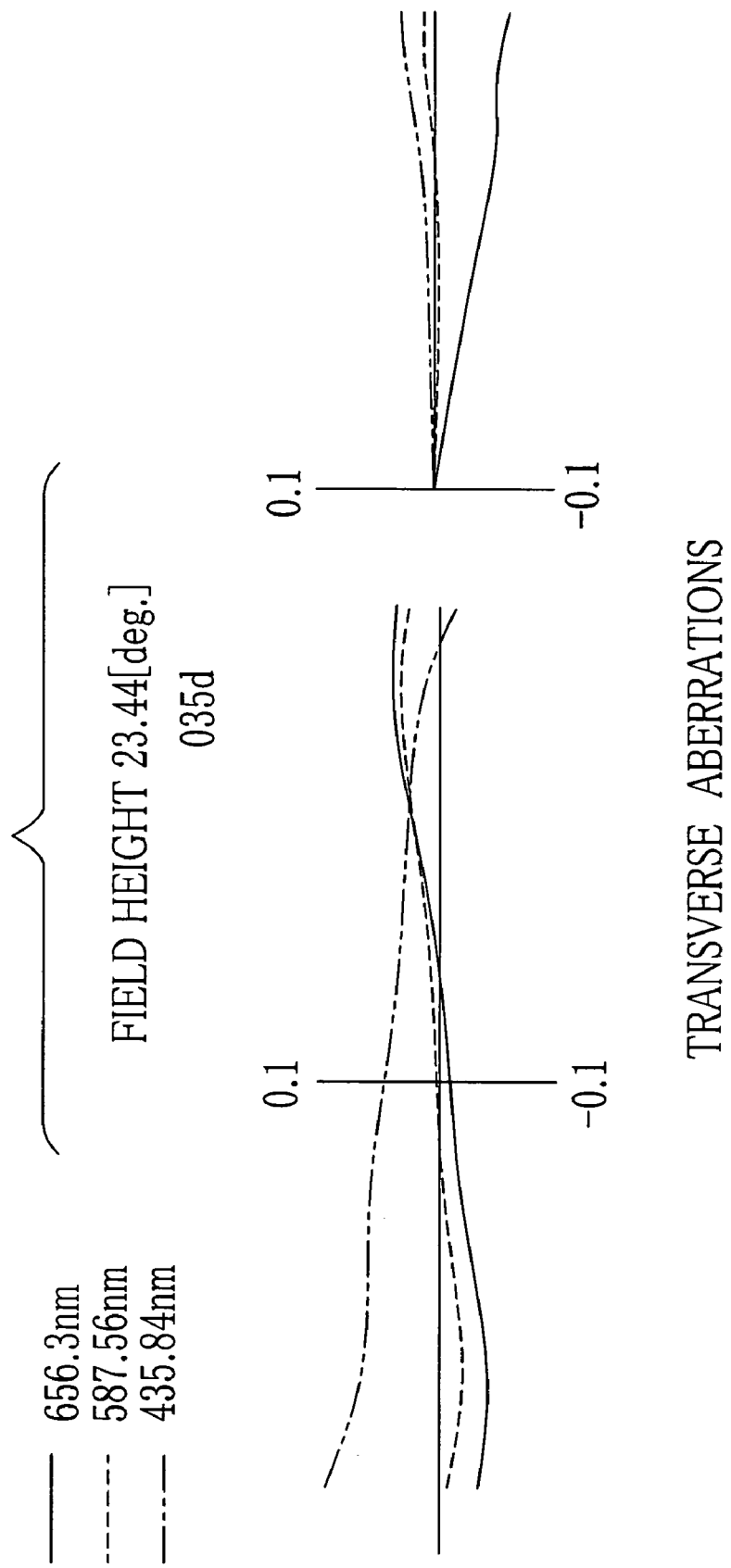
FIG. 9 is a diagram showing transverse aberrations according to Example 3 of the present invention.
Figure 10:
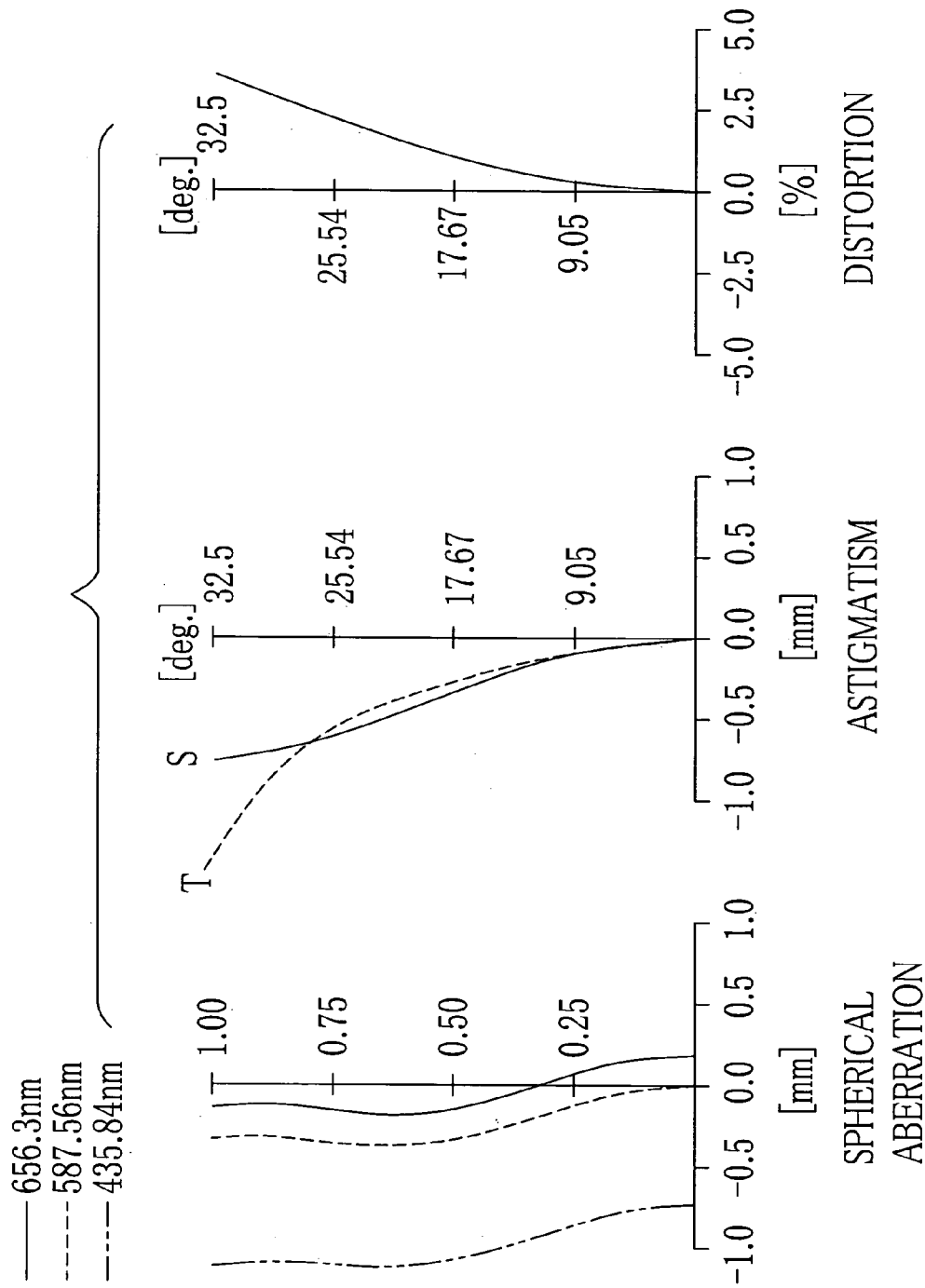
FIG. 10 is a schematic diagram showing longitudinal aberrations according to Example 3.

Various aberrations of Example 3 are illustrated in FIGS. 9 and 10.

As described so far, the photographic lens of the present invention reduces variations in flange back caused by variations in center thickness of the object side first lens element as compared to the conventional ones. In addition to that, the photographic lens of the present invention achieves a higher lens speed than conventional ones where the lens speed could not be higher than 6.4 in terms of f-number to maintain satisfactory image-forming performance.

Because of the lower sensitivity to the dimensional error of the lens element, the photographic lens of the present invention is advantageous in manufacturability. Therefore the photographic lens of the present invention can improve the quality of photographs without requiring high accuracy in manufacture and thus without raising the manufacturing cost.

What is claimed is:

1. A photographic lens comprising a first lens element, a second lens element disposed on image side of said first lens element, and a first stop disposed between said first and second lens elements, said first lens element being a meniscus lens having a convex object side surface, said second lens element being a double-convex lens, said photographic lens satisfying the following conditions:

$5.6 \leq f < 8$;

$F1 > F2$;

$0.39 < F/F1 \leq 0.5$;

$0.15 < R1/F < 0.19$;

$1.4 < (F/R3) \cdot f \leq 3.0$; and $R3 > |R4|$ wherein F is an overall focal length of the photographic lens, F1 is a focal length of said first lens element, F2 is a focal length of said second lens element, f is a ratio of the overall focal length F to an effective aperture size that is defined by the first stop, R1 is a radius of curvature of the object side surface of said first lens element, and R3 and R4 are radii of curvature of the object side spherical surface and of an average spherical surface of the image side aspherical surface of the second lens element respectively.

2. A photographic lens as claimed in claim 1, wherein said first lens element has an aspherical image side surface.

3. A photographic lens as claimed in claim 1, further comprising a second stop having a smaller aperture size, said second stop being movable into and out of a light path between said first lens element and said first stop.

4. A photographic lens as claimed in claim 2, further comprising a second stop having a smaller aperture size, said second stop being movable into and out of a light path between said first lens element and said first stop.

* * * * *